(12) United States Patent
Kikuchi et al.

(10) Patent No.: US 9,356,543 B2
(45) Date of Patent: May 31, 2016

(54) POWER SOURCE CONTROL APPARATUS FOR ROTATING ELECTRICAL MACHINE

(71) Applicant: HONDA MOTOR CO., LTD., Tokyo (JP)

(72) Inventors: Kenji Kikuchi, Saitama (JP); Yoshihiro Ito, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 14/399,767

(22) PCT Filed: Apr. 18, 2013

(86) PCT No.: PCT/JP2013/061483
§ 371 (c)(1),
(2) Date: Nov. 7, 2014

(87) PCT Pub. No.: WO2013/168530
PCT Pub. Date: Nov. 14, 2013

(65) Prior Publication Data
US 2015/0130392 A1    May 14, 2015

(30) Foreign Application Priority Data

May 11, 2012  (JP) ................................. 2012-109544

(51) Int. Cl.
*H02P 1/46* (2006.01)
*H02P 6/04* (2016.01)
(Continued)

(52) U.S. Cl.
CPC ................. *H02P 6/04* (2013.01); *B60L 3/0061* (2013.01); *B60L 3/04* (2013.01); *B60L 7/14* (2013.01);
(Continued)

(58) Field of Classification Search
CPC .... G01R 15/18; G01R 19/16528; G05F 1/66; H02J 3/12; H02P 6/04
See application file for complete search history.

(56) References Cited

U.S. PATENT DOCUMENTS

2007/0290633 A1    12/2007  Atarashi et al.
2015/0233975 A1*    8/2015  Itaya ................ G01R 19/16528
                                                    324/127

FOREIGN PATENT DOCUMENTS

CN    101951217 A    1/2011
JP      7-46721 A    2/1995
(Continued)

OTHER PUBLICATIONS

International Search Report dated Jul. 16, 2013, issued in corresponding application No. PCT/JP2013/061483.
(Continued)

*Primary Examiner* — Karen Mash
(74) *Attorney, Agent, or Firm* — Westerman, Hattori, Daniels & Adrian, LLP (57) ABSTRACT

A power source control apparatus for a rotating electrical machine includes a TRC optimum voltage output portion (21) and a GEN optimum voltage output portion (22) that acquire a TRC optimum voltage and a GEN optimum voltage; a normal target voltage output portion (23) that sets a normal target voltage commonly applied to a traveling motor system and a power generating motor system using a DC/DC converter, based on a highest optimum voltage out of the TRC optimum voltage and the GEN optimum voltage; and a temperature protecting target voltage output portion (24) and a target voltage output portion (25) that limit the voltage commonly applied to the traveling motor system and the power generating motor system to a value lower than the normal target voltage.

3 Claims, 4 Drawing Sheets

(51) Int. Cl.
- *H02P 27/06* (2006.01)
- *H02P 23/14* (2006.01)
- *B60L 3/00* (2006.01)
- *B60L 3/04* (2006.01)
- *B60L 7/14* (2006.01)
- *B60L 15/20* (2006.01)
- *B60L 11/12* (2006.01)

(52) U.S. Cl.
CPC ........... *B60L 11/126* (2013.01); *B60L 15/2009* (2013.01); *H02P 23/14* (2013.01); *H02P 27/06* (2013.01); *B60L 2210/10* (2013.01); *B60L 2210/30* (2013.01); *B60L 2210/40* (2013.01); *B60L 2240/36* (2013.01); *B60L 2240/421* (2013.01); *B60L 2240/423* (2013.01); *B60L 2240/425* (2013.01); *B60L 2240/427* (2013.01); *Y02T 10/6217* (2013.01); *Y02T 10/644* (2013.01); *Y02T 10/645* (2013.01); *Y02T 10/7077* (2013.01); *Y02T 10/7216* (2013.01); *Y02T 10/7241* (2013.01); *Y02T 10/7275* (2013.01)

(56) References Cited

FOREIGN PATENT DOCUMENTS

| | | |
|---|---|---|
| JP | 2007-325397 A | 12/2007 |
| JP | 2008-206339 A | 9/2008 |
| JP | 2010-35386 A | 2/2010 |
| JP | 2012-110189 A | 6/2012 |

OTHER PUBLICATIONS

Chinese Office Action dated Mar. 29, 2016, issued in counterpart Chinese Application No. 201380023963.7, with partial translation (10 pages).

\* cited by examiner

POWER SOURCE CONTROL APPARATUS FOR ROTATING ELECTRICAL MACHINE

TECHNICAL FIELD

The present invention relates to a power source control apparatus for a rotating electrical machine.

Priority is claimed on Japanese Patent Application No. 2012-109544, filed May 11, 2012, the content of which is incorporated herein by reference.

BACKGROUND ART

In the related art, for example, in a series type hybrid vehicle including a traveling motor that drives driving wheels of a vehicle, a power generating motor that is coupled to an internal combustion engine of the vehicle, an inverter using pulse width modulation that controls each motor, and a boosting converter that boosts the direct current (DC) voltage of a DC power source and supplies the boosted DC voltage to each inverter, there is known a power source control apparatus for a rotating electrical machine that performs the processing of lowering the output voltage of the boosting converter in accordance with the magnet temperature of each motor to thereby lower the magnet temperature, with respect to each motor (for example, refer to Patent Document 1).

DOCUMENT OF RELATED ART

Patent Documents

[Patent Document 1] Japanese Unexamined Patent Application, First Publication No. 2008-206339

SUMMARY OF INVENTION

Problems to be Solved by the Invention

According to the power source control apparatus for a rotating electrical machine related to the above related art, the output voltages of the boosting converters (that is, the DC-side voltages of the two inverters) are common to the two inverters. Therefore, if the output voltages of the boosting converters are controlled in accordance with the magnet temperature of either one of the traveling motor and the power generating motor, even if the output voltage is proper with respect to any one of the traveling motor and the power generating motor, there is a possibility that the output voltage may not be proper with respect to the other motor. For example, there is a concern that the magnet temperature may rise excessively or the output of the other motor may be limited.

Aspects related to the invention have been provided in view of the above circumstances, and an object of the invention is to provide a power source control apparatus for a rotating electrical machine that can efficiently secure desired output while preventing overheating of a plurality of motors.

Means for Solving the Problem

The invention has adopted the following aspects in order to solve the above problems and achieve the object concerned.

(1) A power source control apparatus for a rotating electrical machine of an aspect related to the invention includes a plurality of rotating electrical machine systems each of which is constituted by a rotating electrical machine and an energization control device that performs energization control of the rotating electrical machine; a target voltage setting unit that sets a target voltage commonly applied to the plurality of rotating electrical machine systems; a voltage control device that applies the target voltage set by the target voltage setting unit to the plurality of rotating electrical machine systems; an optimum voltage acquiring unit that acquires the optimum voltage of at least any one out of the rotating electrical machine and the energization control device in each of the plurality of rotating electrical machine systems; and a limiting unit that computes a difference between the target voltage and the optimum voltage and limits the voltage applied to the plurality of rotating electrical machine systems by the voltage control device to a value lower than the target voltage when the difference is equal to or greater than a predetermined value.

(2) In the aspect of the above (1), the target voltage setting unit may set the target voltage based on a highest optimum voltage among a plurality of the optimum voltages acquired by the optimum voltage acquiring unit, and the limiting unit may compute a difference between the plurality of optimum voltages, and limit the voltage applied to the plurality of rotating electrical machine systems by the voltage control device to a value lower than the target voltage when the difference is equal to or greater than a predetermined value.

(3) In the aspect of the above (1) or (2), the limiting unit may limit the voltage applied to the plurality of rotating electrical machine systems when the difference is equal to or greater than the predetermined value and the temperature of the rotating electrical machine is equal to or higher than a predetermined temperature.

(4) In the aspect of the above (3), the limiting unit may set the temperature of the rotating electrical machine to substantially the same temperature as the temperature of a coolant that cools the rotating electrical machine.

Advantageous Effect of Invention

According to the aspect of the above (1), when the difference between the target voltage and the optimum voltage is smaller than the predetermined value, the plurality of rotating electrical machine systems can be efficiently operated without the need for limiting the voltage applied to the rotating electrical machine systems such that excessive heat generation does not occur in any of the plurality of rotating electrical machine systems.

When the difference between the target voltage and the optimum voltage is equal to or greater than the predetermined value, the rotating electrical machine control system can be prevented from being brought into a superheated state by limiting the voltage applied to the plurality of rotating electrical machine systems to the value lower than the target voltage, noting that there is a possibility that excessive heat generation may occur in any of the plurality of rotating electrical machine systems.

In the case of the above (2), when the difference between the plurality of optimum voltages is smaller than the predetermined value, the plurality of rotating electrical machine systems can be efficiently operated by setting the target voltage based on the highest optimum voltage, noting that excessive heat generation does not occur in any of the plurality of rotating electrical machine systems.

When the difference between the plurality of optimum voltages is equal to or greater than the predetermined value, the rotating electrical machine control system can be prevented from being brought into a superheated state by limiting the voltage applied to the plurality of rotating electrical machine systems to the value lower than the target voltage, noting that there is a possibility that excessive heat generation may occur in any of the plurality of rotating electrical machine systems.

In the case of the above (3), since the voltage is limited when the temperature of the rotating electrical machine is equal to or higher than the predetermined temperature in addition to the difference between the plurality of optimum voltages being equal to or greater than the predetermined value, the voltage can be prevented from being limited at an excessive frequency, and overheating of the rotating electrical machine control system can be appropriately prevented.

In the case of the above (4), the temperature of the rotating electrical machine can be easily and precisely acquired.

DESCRIPTION OF EMBODIMENTS

A power source control apparatus for a rotating electrical machine related to an embodiment of the invention will be described below referring to the accompanying drawings.

Figure 1:
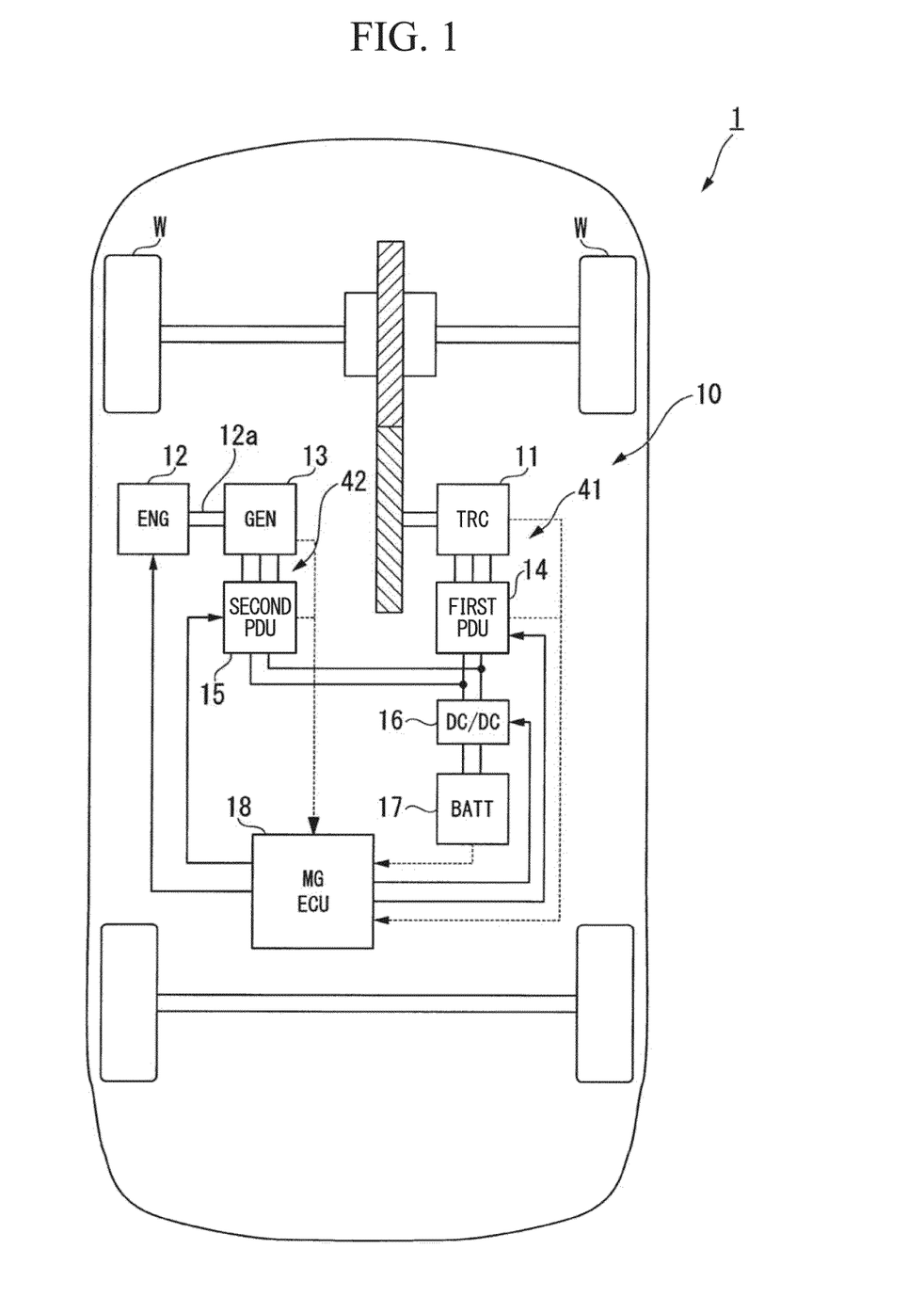
FIG. 1 is a configuration view of a power source control apparatus for a rotating electrical machine related to an embodiment of the invention.

A power source control apparatus 10 for a rotating electrical machine according to the present embodiment is mounted on, for example, a hybrid vehicle 1 illustrated in FIG. 1. The hybrid vehicle 1 is, for example, a series type hybrid vehicle to which a traveling motor (TRC) 11 is coupled to driving wheels W, and a power generating motor (GEN) 13 is connected to a crankshaft 12a of an internal combustion engine (ENG) 12.

The motors 11 and 13 are, for example, three-phase DC brushless motors, respectively, and are connected to first and second power drive units (PDUs) 14 and 15 that control the motors 11 and 13, respectively.

Each of the PDUs 14 and 15 is configured to include, for example, a PWM inverter using pulse width modulation (PWM), including a bridge circuit formed by bridge-connecting a plurality of switching elements, such as transistors.

Each of the PDUs 14 and 15 is connected to a battery (BATT) 17, for example, through a DC/DC converter 16.

The DC/DC converter 16, for example, is capable of raising or lowering a voltage between terminals of the battery (BATT) 17 to a predetermined voltage to apply the raised or lowered voltage to each of the PDUs 14 and 15 and is capable of lowering or raising a voltage between terminals of the respective PDUs 14 and 15 (DC-side voltage) to a predetermined voltage to charge the battery 17.

For example, when the traveling motor 11 is driven, the first PDU 14 converts the DC power supplied from the DC/DC converter 16 or the second PDU 15 of the power generating motor 13 into AC power and supplies the AC power to the traveling motor 11.

Additionally, for example, when the power generating motor 13 generates power using the power of the internal combustion engine 12, the second PDU 15 converts the AC generated power from the power generating motor 13 into DC power to charge the battery 17 through the DC/DC converter 16 or to supply the converted power to the first PDU 14 of the traveling motor 11.

Additionally, for example, if driving power is transmitted from the driving wheels W side to the traveling motor 11 side during the deceleration of the hybrid vehicle 1 or the like, the traveling motor 11 functions as a generator to generate a so-called regenerative braking force and collect the kinetic energy of a vehicle body as electrical energy. During the power generation of the traveling motor 11, the PDU 14 converts the AC generated (regenerated) power output from the traveling motor 11 into DC power and charges the battery 17 through the DC/DC converter 16.

Moreover, the power source control apparatus 10 for a rotating electrical machine includes an MGECU 18 that controls the hybrid vehicle 1 in an integrated manner, as an electronic control unit (ECU) constituted by, for example, an electronic circuit, such as a central processing unit (CPU).

Figure 2:
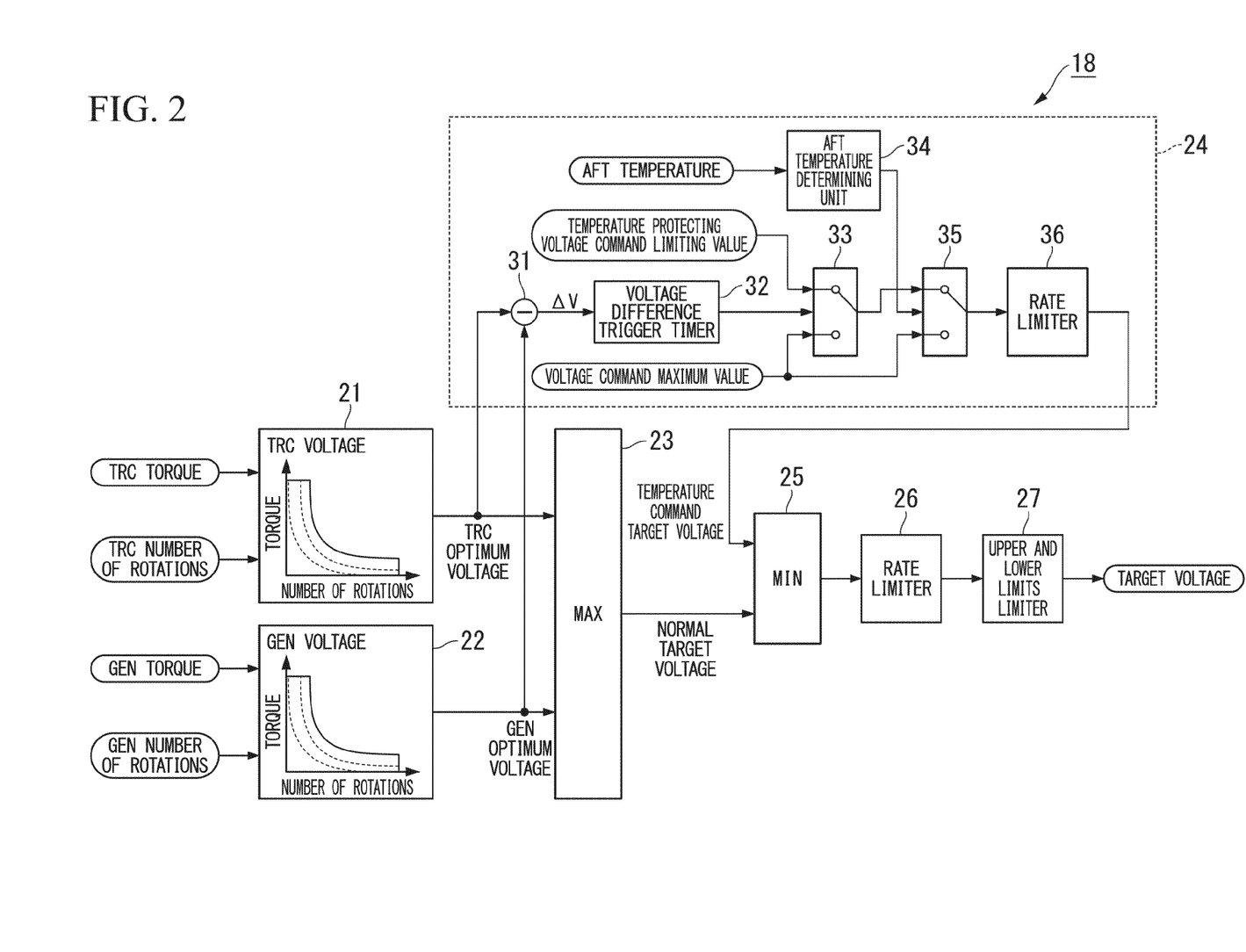
FIG. 2 is a configuration view of an MGECU of the power source control apparatus for a rotating electrical machine related to the embodiment of the invention.

The MGECU 18, for example as illustrated in FIG. 2, is configured to include a TRC optimum voltage output portion 21, a GEN optimum voltage output portion 22, a normal target voltage output portion 23, a temperature protecting target voltage output portion 24, a target voltage output portion 25, a rate limiter 26, and an upper and lower limits limiter 27.

The TRC optimum voltage output portion 21, for example, acquires a TRC optimum voltage according to a torque (TRC torque) and the number of rotations (TRC number of rotations) required for the traveling motor 11 in accordance with the operational state or the like of the hybrid vehicle 1, based on the data of a preset predetermined map or the like with respect to a power source voltage (a TRC optimum voltage, that is, the optimum voltage of the DC-side voltage of the first PDU 14) at which the operation loss of a traveling motor system (rotating electrical machine system) consisting of the traveling motor 11 and the first PDU 14 is minimized, and outputs this acquisition result.

Figure 3A:
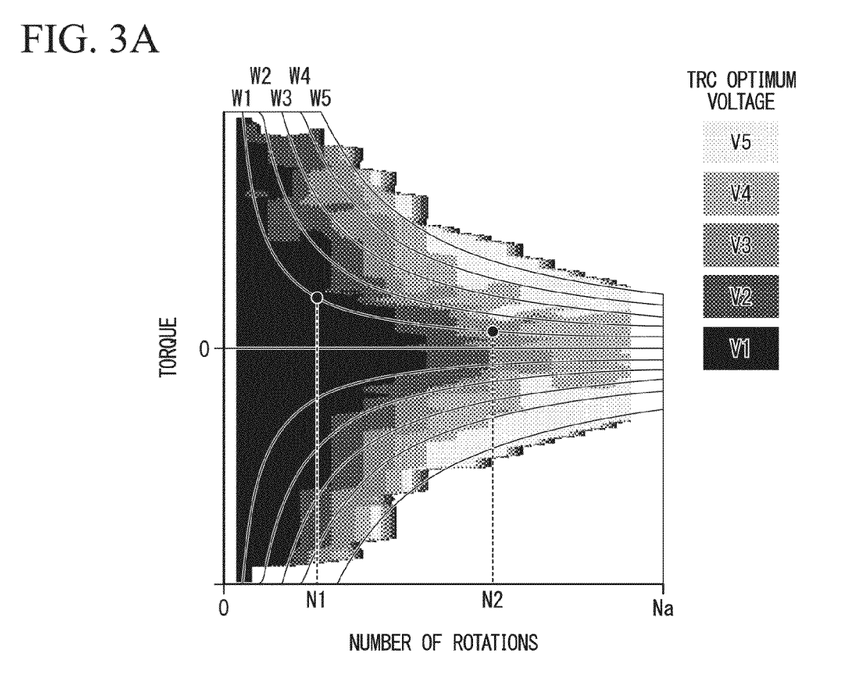
FIG. 3A is a view illustrating an example of an optimum voltage according to torque and number of rotations in a traveling motor system of the power source control apparatus for a rotating electrical machine related to the embodiment of the invention.

In addition, the preset predetermined map, for example as illustrated in FIG. 3A, is data showing the correspondence relationship between the torque and number of rotations of the traveling motor 11 and the TRC optimum voltage and is stored in the TRC optimum voltage output portion 21.

In addition, the TRC optimum voltage may be, for example, a power source voltage at which the operation loss of at least one of the traveling motor 11 and the first PDU 14 is minimized.

The GEN optimum voltage output portion 22, for example, acquires a GEN optimum voltage according to a torque (GEN torque) and the number of rotations (GEN number of rotations) required for the power generating motor 13 in accordance with the operational state or the like of the hybrid vehicle 1, based on the data of a preset predetermined map or the like with respect to a power source voltage (a GEN optimum voltage, that is, the optimum voltage of the DC-side voltage of the second PDU 15) at which the operation loss of a power generating motor system (rotating electrical machine system) consisting of the power generating motor 13 and the second PDU 15 is minimized, and outputs this acquisition result.

Figure 3B:
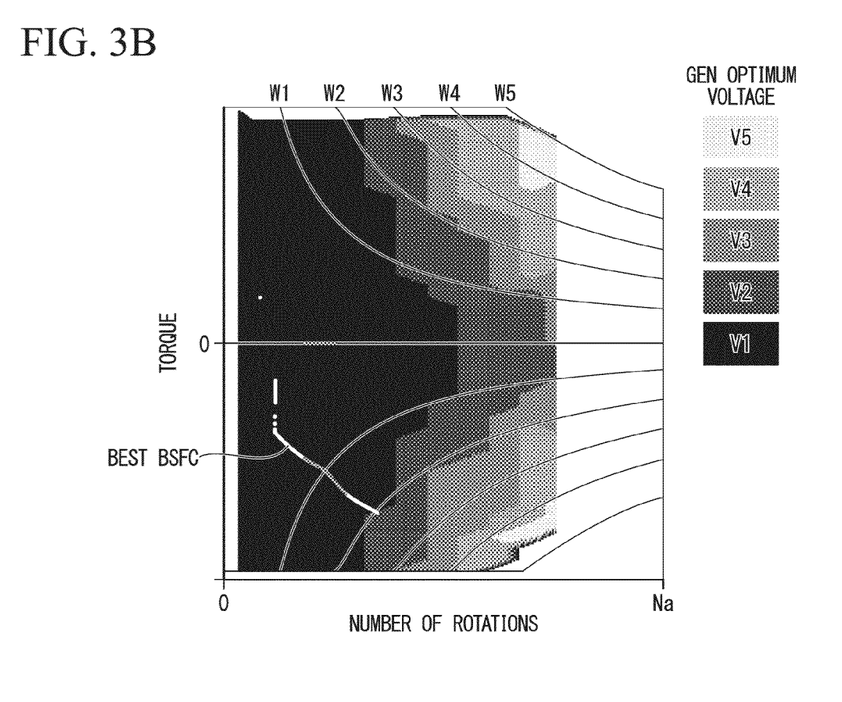
FIG. 3B is a view illustrating an example of an optimum voltage according to torque and number of rotations in a power generating motor system of the power source control apparatus for a rotating electrical machine related to the embodiment of the invention.

In addition, the preset predetermined map, for example as illustrated in FIG. 3B, is data showing the correspondence relationship between the torque and number of rotations of the power generating motor 13 and the GEN optimum voltage, and is stored in the GEN optimum voltage output portion 22.

In addition, the GEN optimum voltage may be, for example, a power source voltage at which the operation loss of at least one of the power generating motor 13 and the second PDU 15 is minimized.

The normal target voltage output portion 23, for example, outputs the highest optimum voltage out of the TRC optimum voltage output from the TRC optimum voltage output portion 21 and the GEN optimum voltage output from the GEN optimum voltage output portion 22 as a normal target voltage.

The temperature protecting target voltage output portion 24, for example, is configured to include a voltage difference computing unit 31, a voltage difference trigger timer 32, a first output switching portion 33, an AFT temperature determining unit 34, a second output switching portion 35, and a rate limiter 36.

The voltage difference computing unit 31, for example, computes a difference ΔV between the TRC optimum voltage output from the TRC optimum voltage output portion 21 and the GEN optimum voltage output from the GEN optimum voltage output portion 22, and outputs this computation result.

The voltage difference trigger timer 32, for example, determines whether or not a state where the difference ΔV output from the voltage difference computing unit 31 becomes equal to or greater than a predetermined value lasts for a predetermined period or more, and outputs this determination result.

The first output switching portion 33, for example, switches selection of any one of two different voltage values with respect to a voltage (that is, a voltage applied to each of the PDUs 14 and 15) between secondary-side terminals of the DC/DC converter 16, that is, a predetermined temperature protecting voltage command limiting value, and a voltage command maximum value, in accordance with the determination result output from the voltage difference trigger timer 32, and outputs the selection result.

For example, the first output switching portion 33 selects and outputs the predetermined temperature protecting voltage command limiting value when it is determined that a state where the difference ΔV becomes equal to or greater than the predetermined value lasts for the predetermined period or more, and selects and outputs a predetermined voltage command maximum value when it is not determined that the state where the difference ΔV reaches the predetermined value or greater lasts for the predetermined period or more.

In addition, the predetermined temperature protecting voltage command limiting value is, for example, a limiting value or the like for limiting the temperatures of the traveling motor system and the power generating motor system to a value smaller than a predetermined maximum temperature and has a value smaller than a normal target voltage output from the normal target voltage output portion 23.

Additionally, the predetermined voltage command maximum value is, for example, a maximum value that can be set as a target voltage for the voltage between the secondary-side terminals of the DC/DC converter 16.

The AFT temperature determining unit 34, for example, determines whether an AFT temperature is equal to or higher than a predetermined temperature, with respect to a detection value, an estimation value, or the like of the AFT temperature related to the temperature of at least any among the respective motors 11 and 12 and the respective PDUs 14 and 15 (that is, the temperature of a coolant that cools the traveling motor system and the power generating motor system), and outputs the determination result.

In addition, the predetermined temperature may have hysteresis. For example, the AFT temperature determining unit 34 determines that the AFT temperature is equal to or higher than the predetermined temperature when it is determined that the AFT temperature is lower than the predetermined temperature and when the AFT temperature reaches a first predetermined temperature or higher, and determines that the AFT temperature is lower than the predetermined temperature when it is determined that the AFT temperature is equal to or higher than the predetermined temperature and when the AFT temperature becomes lower than a second temperature lower than the first predetermined temperature.

The second output switching portion 35, for example, switches selection of any one of two voltage values with respect to the voltage between the secondary-side terminals of the DC/DC converter 16 (that is, the DC-side voltage applied to the DC side of each of the PDUs 14 and 15), that is, the voltage value output from the first output switching portion 33 and the predetermined voltage command maximum value, in accordance with the determination result output from the AFT temperature determining unit 34 and outputs the selection result.

For example, the second output switching portion 35 selects and outputs the voltage value output from the first output switching portion 33 when it is determined that the AFT temperature is equal to or higher than the predetermined temperature, and selects and outputs the predetermined voltage command maximum value when it is not determined that the AFT temperature is equal to or higher than the predetermined temperature (that is, when the AFT temperature is lower than the predetermined temperature).

The rate limiter 36, for example, limits the rate of change in the voltage value output from the second output switching portion 35 to a predetermined rate of change, and outputs a voltage value after this limitation as a temperature protecting target voltage.

The target voltage output portion 25, for example, outputs the lowest optimum voltage out of the normal target voltage output from the normal target voltage output portion 23 and the temperature protecting target voltage output from the temperature protecting target voltage output portion 24 as the target voltage.

The rate limiter 26, for example, limits the rate of change in the target voltage output from the target voltage output portion 25 to a predetermined rate of change and outputs the target voltage after this limitation.

The upper and lower limits limiter 27, for example, limits an upper limit and a lower limit of the target voltage output from the rate limiter 26, and outputs the target voltage after this limitation.

The MGECU 18, for example, controls power conversion operation of the respective PDUs 14 and 15 and the DC/DC converter 16 in accordance with the target voltage for the DC-side voltage (that is, the secondary-side voltage of the DC/DC converter 16) of each of the PDUs 14 and 15. The driving and power generation of the traveling motor 11 and the power generation of the power generating motor 13 by the power of the internal combustion engine 12 are controlled.

The power source control apparatus 10 for a rotating electrical machine according to the present embodiment includes the above configuration. Next the operation of the power source control apparatus 10 for a rotating electrical machine, particularly the processing of setting the target voltage will be described.

The TRC optimum voltage output from the TRC optimum voltage output portion 21 changes in accordance with, for example, an accelerator pedal opening degree operated by a driver in an operational state of the hybrid vehicle 1.

In contrast, the GEN optimum voltage output from GEN optimum voltage output portion 22 changes in accordance with an operational state or the like where the brake specific fuel consumption (BSFC) of the internal combustion engine 12 is the best, for example as illustrated in FIG. 3B, as the operational state of the hybrid vehicle 1.

The temperature protecting target voltage output from the temperature protecting target voltage output portion 24, for example, becomes the predetermined temperature protecting voltage command limiting value when the state where the difference $\Delta V$ between the TRC optimum voltage and the GEN optimum voltage becomes equal to or greater than the predetermined value lasts for the predetermined period or more and when the AFT temperature becomes equal to or higher than the predetermined temperature, and becomes the predetermined voltage command maximum value in cases other than this.

The TRC optimum voltage at a predetermined output W1 becomes a predetermined voltage V1, for example, in a low number-of-rotations region (predetermined number of rotations N1 or the like) of the traveling motor 11 illustrated in FIG. 3A, whereas the difference $\Delta V$ between the TRC optimum voltage and the GEN optimum voltage becomes smaller than the predetermined value, for example, when the GEN optimum voltage at the predetermined output W1 of the power generating motor 13 becomes the predetermined voltage V1 in accordance with the operational state where the BSFC of the internal combustion engine 12 illustrated in FIG. 3B is the best.

If at least the difference $\Delta V$ is smaller than the predetermined value, the normal target voltage output from the normal target voltage output portion 23 becomes one where both of the operational states including, for example, the operational state of the traveling motor system according to the accelerator pedal opening degree or the like and, for example, the operational state of the power generating motor system where the BSFC of the internal combustion engine 12 is the best are realized.

In this case, the temperature protecting target voltage output from the temperature protecting target voltage output portion 24 is the predetermined voltage command maximum value. If this voltage command maximum value is set to a value greater than the TRC optimum voltage and the GEN optimum voltage, the target voltage output from the target voltage output portion 25 becomes the normal target voltage output from the normal target voltage output portion 23.

Meanwhile, the TRC optimum voltage at the predetermined output W1 becomes a predetermined voltage V3, for example, in a high number-of-rotations region (predetermined number of rotations N2 or the like) of the traveling motor 11 illustrated in FIG. 3A, whereas the difference $\Delta V$ between the TRC optimum voltage and the GEN optimum voltage becomes equal to or greater than the predetermined value, for example, when the GEN optimum voltage at the predetermined output W1 of the power generating motor 13 becomes the predetermined voltage V1 in accordance with the operational state where the BSFC of the internal combustion engine 12 illustrated in FIG. 3B is the best.

When the state where the difference $\Delta V$ becomes equal to or greater than the predetermined value lasts for the predetermined period or more and when the AFT temperature is equal to or higher than the predetermined temperature, there is a concern that the normal target voltage output from the normal target voltage output portion 23 causes excessive heat generation in any one of (for example, a system where the optimum voltage is smaller) the traveling motor system and the power generating motor system.

In this case, the temperature protecting target voltage output from the temperature protecting target voltage output portion 24 is the predetermined temperature protecting voltage command limiting value that limits the temperatures of the traveling motor system and the power generating motor system to a value smaller than the predetermined maximum temperature and is smaller than the normal target voltage output from the normal target voltage output portion 23, and the target voltage output from the target voltage output portion 25 becomes the temperature protecting target voltage output from the temperature protecting target voltage output portion 24.

That is, when the difference $\Delta V$ of the TRC optimum voltage and the GEN optimum voltage is equal to or greater than the predetermined value, the voltages applied to the traveling motor system and the power generating motor system are limited to a value smaller than the normal target voltage.

Figure 4A:
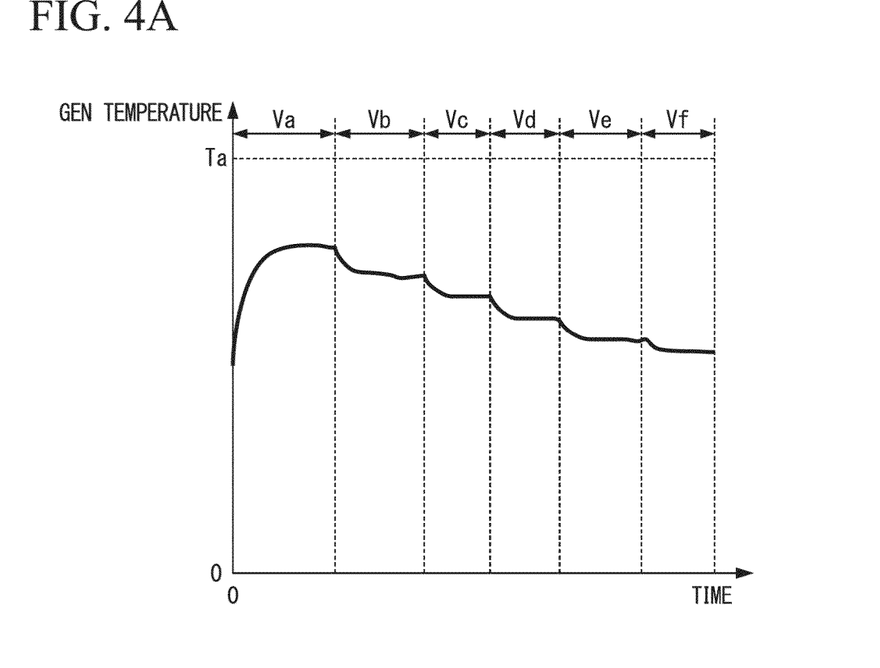
FIG. 4A is a view illustrating an example of temperature changes in the power generating motor system of the power source control apparatus for a rotating electrical machine related to the embodiment of the invention.
Figure 4B:
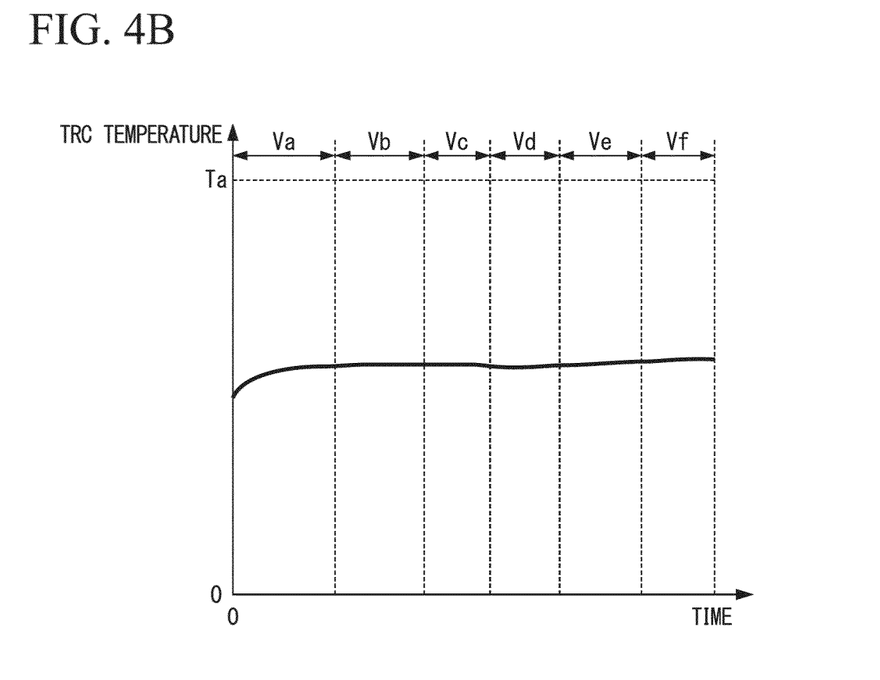
FIG. 4B is a view illustrating an example of temperature changes in the traveling generating motor system of the power source control apparatus for a rotating electrical machine related to the embodiment of the invention.

For example, an example of changes in the temperature (GEN temperature) of the power generating motor system and the temperature (TRC temperature) of the traveling motor system when the target voltage is gradually lowered from a predetermined voltage Va to a predetermined voltage Vf (<Va), in accordance with the temperature protecting target voltage output from the temperature protecting target voltage output portion 24, in an operational state where the TRC optimum voltage is the predetermined voltage Va, the GEN optimum voltage is the predetermined voltage Vf, and the difference $\Delta V$ becomes equal to or greater than the predetermined value, is illustrated in FIGS. 4A and 4B.

For example, when the target voltage is a value close to the predetermined voltage Va of the TRC optimum voltage, the AFT temperature becomes equal to or higher than the predetermined temperature because the GEN temperature is a higher temperature compared with the TRC temperature. In this case, the temperature protecting target voltage output from the temperature protecting target voltage output portion 24 is the predetermined temperature protecting voltage command limiting value, and the target voltage output from the target voltage output portion 25 becomes the temperature protecting target voltage output from the temperature protecting target voltage output portion 24.

If the target voltage is gradually lowered from the predetermined voltage Va to the predetermined voltage Vf (<Va) in accordance with the temperature protecting target voltage output from the temperature protecting target voltage output portion 24, the GEN temperature changes with a falling tendency, whereas the TRC temperature is substantially constant.

Along with this, when the target voltage is a value close to the predetermined voltage Vf of a GEN optimum voltage, and the AFT temperature becomes lower than the predetermined temperature because the GEN temperature and the TRC temperature become approximately equal to each other. In this case, the temperature protecting target voltage output from the temperature protecting target voltage output portion 24 is the predetermined voltage command maximum value, and the target voltage output from the target voltage output portion 25 becomes the normal target voltage output from the normal target voltage output portion 23.

As described above, according to the power source control apparatus 10 for a rotating electrical machine related to the present embodiment, when the difference $\Delta V$ between the TRC optimum voltage and the GEN optimum voltage is smaller than the predetermined value, the traveling motor system and the power generating motor system can be efficiently operated by setting the target voltage based on the highest optimum voltage such that excessive heat generation does not occur in any of the traveling motor system and the power generating motor system.

When the difference $\Delta V$ is equal to or greater than the predetermined value, the traveling motor system and the power generating motor system can be prevented from being brought into a superheated state by limiting the voltage between the secondary-side terminals of the DC/DC converter 16 applied to the traveling motor system and the power generating motor system to a value lower than the target voltage, noting that there is a possibility that excessive heat generation may occur in any of the traveling motor system and the power generating motor system.

Moreover, since the target voltage for the voltage between the secondary-side terminals of the DC/DC converter 16 is limited when the AFT temperature is equal to or higher than the predetermined temperature in addition to the difference $\Delta V$ being equal to or greater than the predetermined value, the target voltage can be prevented from being limited at an excessive frequency, and overheating of the traveling motor system and the power generating motor system can be appropriately prevented.

Moreover, the temperatures of the traveling motor system and the power generating motor system can be easily and precisely acquired depending on the AFT temperature, and temperature protection can be appropriately performed in all of the motors 11 and 13 and the PDUs 14 and 15.

In addition, in the above-described embodiment, the power source control apparatus 10 for a rotating electrical machine may include a plurality of rotating electrical machines with different loads, and a plurality of power drive units (PDUs) that perform energization control of these rotating electrical machines, without being limited to the traveling motor 11 and the power generating motor 13, and may set the target voltage in accordance with differences between the plurality optimum voltages.

In addition, in the above-described embodiment, the hybrid vehicle 1 is not limited to the series type, and may be, for example, a hybrid vehicle having functions of both the series type and a parallel type, or a power split type hybrid vehicle.

Additionally, the power source control apparatus 10 for a rotating electrical machine may be mounted on, for example, an electric vehicle to which the traveling motor (TRC) 11 is coupled to the driving wheels W, without being limited to the hybrid vehicle 1.

In addition, in the above-described embodiment, the normal target voltage output portion 23 uses the highest optimum voltage out of the TRC optimum voltage and the GEN optimum voltage as the normal target voltage. However, the invention is not limited to this, and the target voltage may be set based on the highest optimum voltage of the TRC optimum voltage and the GEN optimum voltage.

In addition, in the above-described embodiment, the AFT temperature determining unit 34 may use the AFT temperature as, for example, the detection value, estimation value, or the like of the temperature of at least one among the motors 11 and 12 and the PDUs 14 and 15.

In addition, in the above-described embodiment, when the target voltage output from the target voltage output portion 25 is the temperature protecting target voltage output from the temperature protecting target voltage output portion 24, a carrier frequency may be increased within a range where element temperatures become lower than the predetermined maximum temperature in the PWM inverter of each of the PDUs 14 and 15.

In addition, in the above-described embodiment, the voltages applied to the traveling motor system and the power generating motor system are limited to a value smaller than the normal target voltage when the difference $\Delta V$ between the TRC optimum voltage and the GEN optimum voltage is equal to or greater than the predetermined value. However, when the highest optimum voltage out of the TRC optimum voltage and the GEN optimum voltage is output as the normal target voltage in the normal target voltage output portion 23, the difference $\Delta V$ computed by the voltage difference computing unit 31 becomes a difference between the target voltage (that is, the normal target voltage output from the normal target voltage output portion 23) and the optimum voltage (that is, any smaller optimum voltage out of the TRC optimum voltage and the GEN optimum voltage).

In the above-described embodiment, the difference between the target voltage (for example, the normal target voltage output from the normal target voltage output portion 23) and the optimum voltage (any smaller optimum voltage out of the TRC optimum voltage and the GEN optimum voltage) may be computed based on this, and when this difference is equal to or greater than the predetermined value, the voltages applied to the traveling motor system and the power generating motor system may be limited to a value smaller than the target voltage.

DESCRIPTION OF REFERENCE SYMBOLS

1: HYBRID VEHICLE
10: POWER SOURCE CONTROL APPARATUS OF ROTATING ELECTRICAL MACHINE
11: TRAVELING MOTOR (ROTATING ELECTRICAL MACHINE)
12: INTERNAL COMBUSTION ENGINE
13: POWER GENERATING MOTOR (ROTATING ELECTRICAL MACHINE)
14: FIRST PDU (ENERGIZATION CONTROL DEVICE)
15: SECOND PDU (ENERGIZATION CONTROL DEVICE)
16: DC/DC CONVERTER (VOLTAGE CONTROL DEVICE)
18: MGECU
21: TRC OPTIMUM VOLTAGE OUTPUT PORTION (OPTIMUM VOLTAGE ACQUIRING UNIT)
22: GEN OPTIMUM VOLTAGE OUTPUT PORTION (OPTIMUM VOLTAGE ACQUIRING UNIT)
23: NORMAL TARGET VOLTAGE OUTPUT PORTION (TARGET VOLTAGE SETTING UNIT)
24: TEMPERATURE PROTECTING TARGET VOLTAGE OUTPUT PORTION (LIMITING UNIT)
25: TARGET VOLTAGE OUTPUT PORTION (LIMITING UNIT)
33: FIRST OUTPUT SWITCHING PORTION
35: SECOND OUTPUT SWITCHING PORTION

What is claimed is:

1. A power source control apparatus for a rotating electrical machine, the control apparatus comprising:
   a plurality of rotating electrical machine systems each of which is constituted by a rotating electrical machine and an energization control device that performs energization control of the rotating electrical machine;
   a target voltage setting unit that sets a target voltage commonly applied to the plurality of rotating electrical machine systems;
   a voltage control device that applies the target voltage set by the target voltage setting unit to the plurality of rotating electrical machine systems;
   an optimum voltage acquiring unit that acquires the optimum voltage of at least any one out of the rotating electrical machine and the energization control device in each of the plurality of rotating electrical machine systems; and
   a limiting unit that limits the voltage applied to the plurality of rotating electrical machine systems by the voltage control device,
   wherein the target voltage setting unit sets the target voltage based on a highest optimum voltage among a plurality of the optimum voltages acquired by the optimum voltage acquiring unit, and
   wherein the limiting unit computes a difference between the plurality of optimum voltages, and limits the voltage applied to the plurality of rotating electrical machine systems by the voltage control device to a value lower than the target voltage when the difference is equal to or greater than a predetermined value.

2. The power source control apparatus for a rotating electrical machine according to claim 1,
   wherein the limiting unit limits the voltage applied to the plurality of rotating electrical machine systems when a state where the difference becomes equal to or greater than the predetermined value lasts for a predetermined period or more and the temperature of the rotating electrical machine is equal to or higher than a predetermined temperature.

3. The power source control apparatus for a rotating electrical machine according to claim 2,
   wherein the limiting unit sets the temperature of the rotating electrical machine to substantially the same temperature as the temperature of a coolant that cools the rotating electrical machine.

* * * * *